United States Patent
Kubota et al.

(10) Patent No.: US 8,662,295 B2
(45) Date of Patent: Mar. 4, 2014

(54) STORING CASE FOR MEMORY CARD

(75) Inventors: Ikuo Kubota, Kanagawa-ken (JP); Takamasa Araki, Tokyo (JP); Atsushi Watanabe, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 5 days.

(21) Appl. No.: 13/609,470

(22) Filed: Sep. 11, 2012

(65) Prior Publication Data

US 2013/0062233 A1  Mar. 14, 2013

(30) Foreign Application Priority Data

Sep. 13, 2011 (JP) ................................. 2011-200002

(51) Int. Cl.
*B65D 85/00* (2006.01)
*B65D 79/00* (2006.01)

(52) U.S. Cl.
USPC .................. 206/307; 206/307.1; 206/751

(58) Field of Classification Search
USPC ............. 206/307, 307.1, 701, 477, 478, 480, 206/482, 493, 706, 707, 308.1, 751, 752
See application file for complete search history.

(56) References Cited

U.S. PATENT DOCUMENTS

| | | | | |
|---|---|---|---|---|
| 4,724,956 A | * | 2/1988 | Ozeki | 206/307 |
| 4,957,205 A | * | 9/1990 | Rose, Jr. | 206/308.3 |
| 5,373,944 A | * | 12/1994 | Ishitsuka | 206/308.3 |
| 6,230,885 B1 | * | 5/2001 | Rochelo et al. | 206/308.3 |
| 6,587,348 B2 | * | 7/2003 | Kondo | 361/741 |
| 7,293,647 B2 | * | 11/2007 | Wong et al. | 206/307.1 |
| 7,306,159 B1 | * | 12/2007 | Rochelo | 235/492 |
| D593,561 S | * | 6/2009 | Sheba | D14/435 |
| D613,744 S | * | 4/2010 | Sheba et al. | D14/435 |
| 7,757,847 B2 | * | 7/2010 | Tang et al. | 206/307.1 |
| 2005/0258068 A1 | * | 11/2005 | Chien | 206/701 |
| 2006/0144751 A1 | * | 7/2006 | Tsang | 206/707 |
| 2007/0202956 A1 | | 8/2007 | Ogasawara et al. | |

* cited by examiner

*Primary Examiner* — Steven A. Reynolds
*Assistant Examiner* — Ernesto Grano
(74) *Attorney, Agent, or Firm* — Matthew B. Dernier, Esq.; Gibson & Dernier LLP

(57) ABSTRACT

Each of areas surrounded by a plurality of main holders of a first case panel faces an area surrounded by each holder of a second case panel, at least partially. Each main holder includes a wall projecting toward the second case panel to prevent separation of a memory card placed in the holder. This structure enables a storing case to stably hold a plurality of memory card without enlarging the case.

8 Claims, 6 Drawing Sheets

FIG.6

STORING CASE FOR MEMORY CARD

CROSS-REFERENCE TO RELATED APPLICATION

The present application claims priority from Japanese application JP2011-200002 filed on Sep. 13, 2011, the content of which is hereby incorporated by reference into this application.

BACKGROUND OF THE INVENTION

1. Field of the Invention

The present invention relates to a case for storing a plurality of memory cards.

2. Description of the Related Art

Conventionally, electronic devices using a memory card have been available (e.g., U.S. Patent Application Publication 2007/0202956). A memory card may be stored in a case molded by resin when not used. Many cases have a holder on their inside surfaces and the holder includes a hook so that a memory card can be held in the holder.

SUMMARY OF THE INVENTION

There may be a situation in which a case receives shock such as when a user drops a case. Therefore, it is desired that a memory card will not come off the holder even in such a situation. Moreover, a case capable of storing two or more memory cards will be convenient for a user.

A storing case according to an aspect of the present invention comprises a first case panel, and a second case panel capable of being opened and closed relative to the first case panel. The first case panel includes a plurality of first holders on a surface thereof facing toward the second case panel, each first holder being for holding a memory card and surrounding an area where the memory card is placed. The second case panel includes a plurality of second holders on a surface thereof facing toward the first case panel, each second holder being for holding a memory card and surrounding an area where the memory card is placed. The area surrounded by at least one of the first holders faces the area surrounded by at least one of the second holder, at least partially. The at least one of the first holders includes a projection, the projection projecting toward the second case panel to prevent the memory card arranged in the at least one of the second holders from separating therefrom.

According to the above storing case, a part of the holder is utilized as a projection for preventing the memory card from separating from the second holder, so that it is possible to stably hold a memory card, while not enlarging the size of the case.

DETAILED DESCRIPTION OF THE INVENTION

Figure 1:
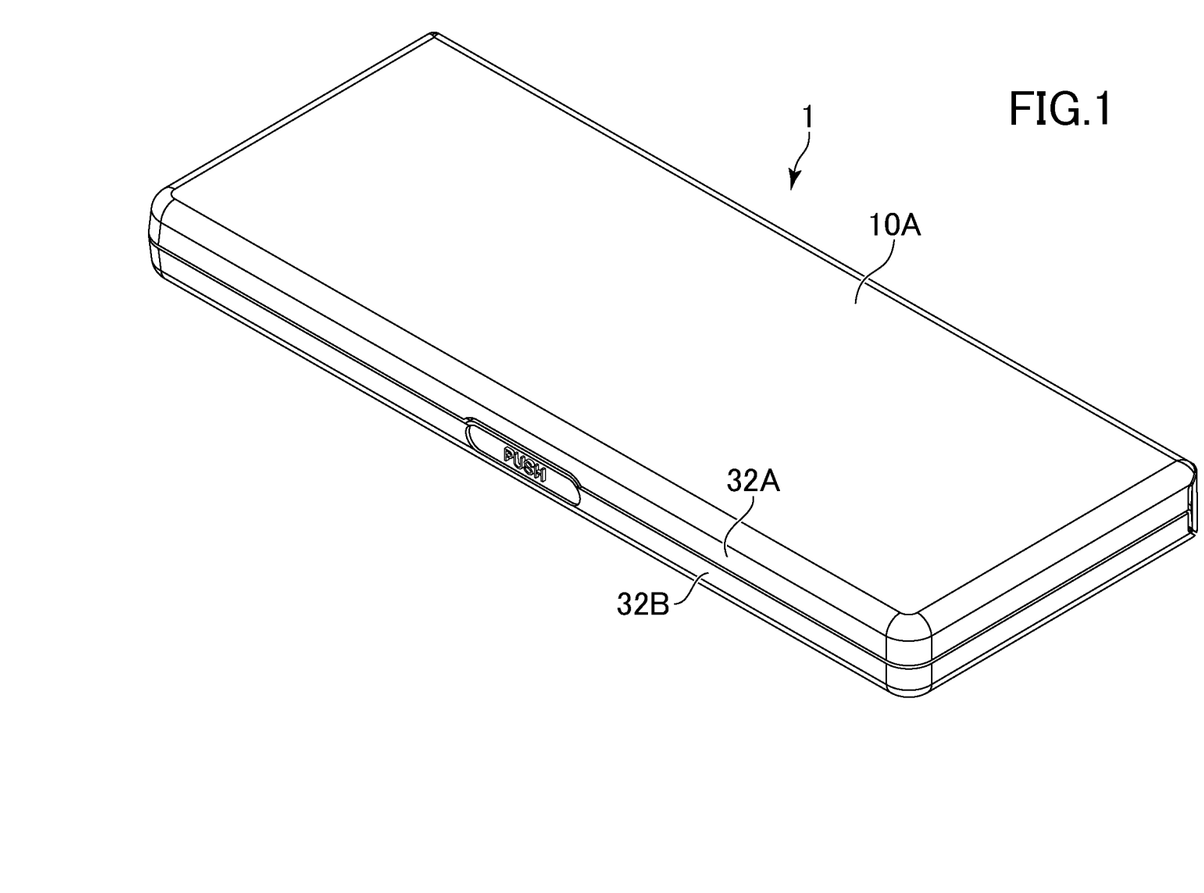
FIG. 1 is a perspective view of a storing case according to one embodiment of the present invention.
Figure 2:
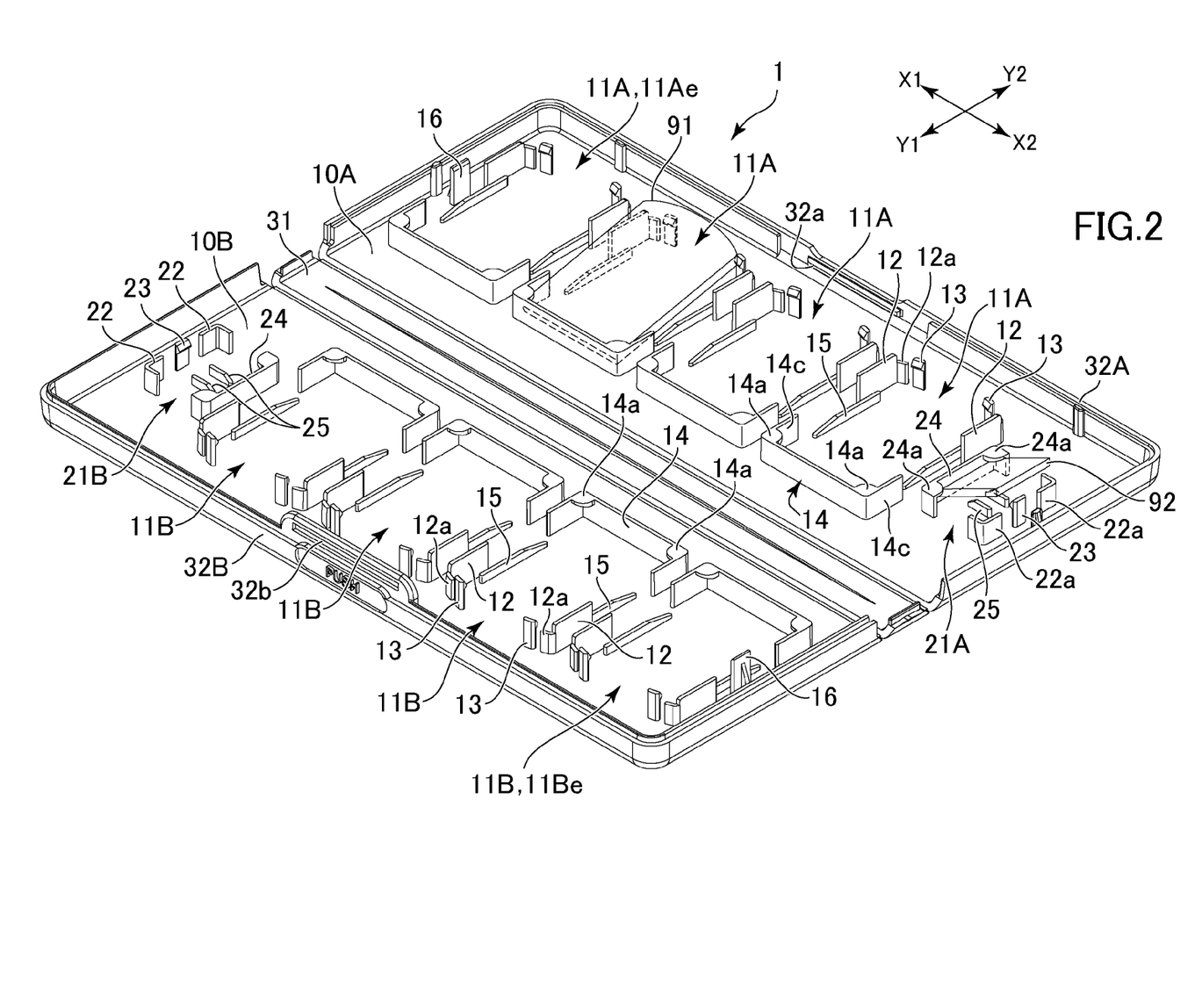
FIG. 2 is a perspective view showing the storing case in an open state.
Figure 3:
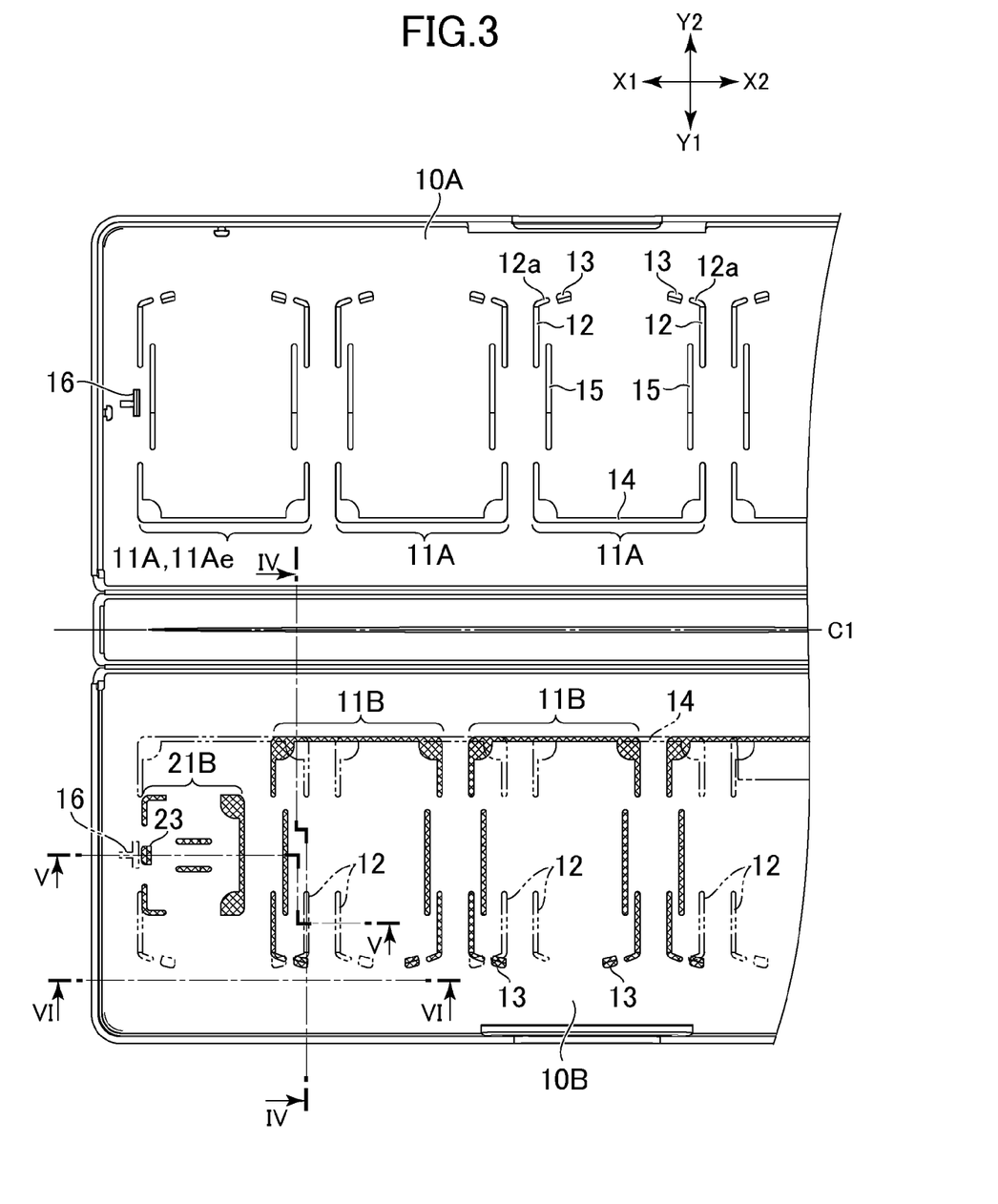
FIG. 3 is a plan view showing the storing case in an open state. In this figure, a second main holder and a second sub-holder are hatched for clarification. The two-dot dashed line shows positions where a first main holder and a first sub-holder are arranged in a closed state of the storing case.
Figure 4:
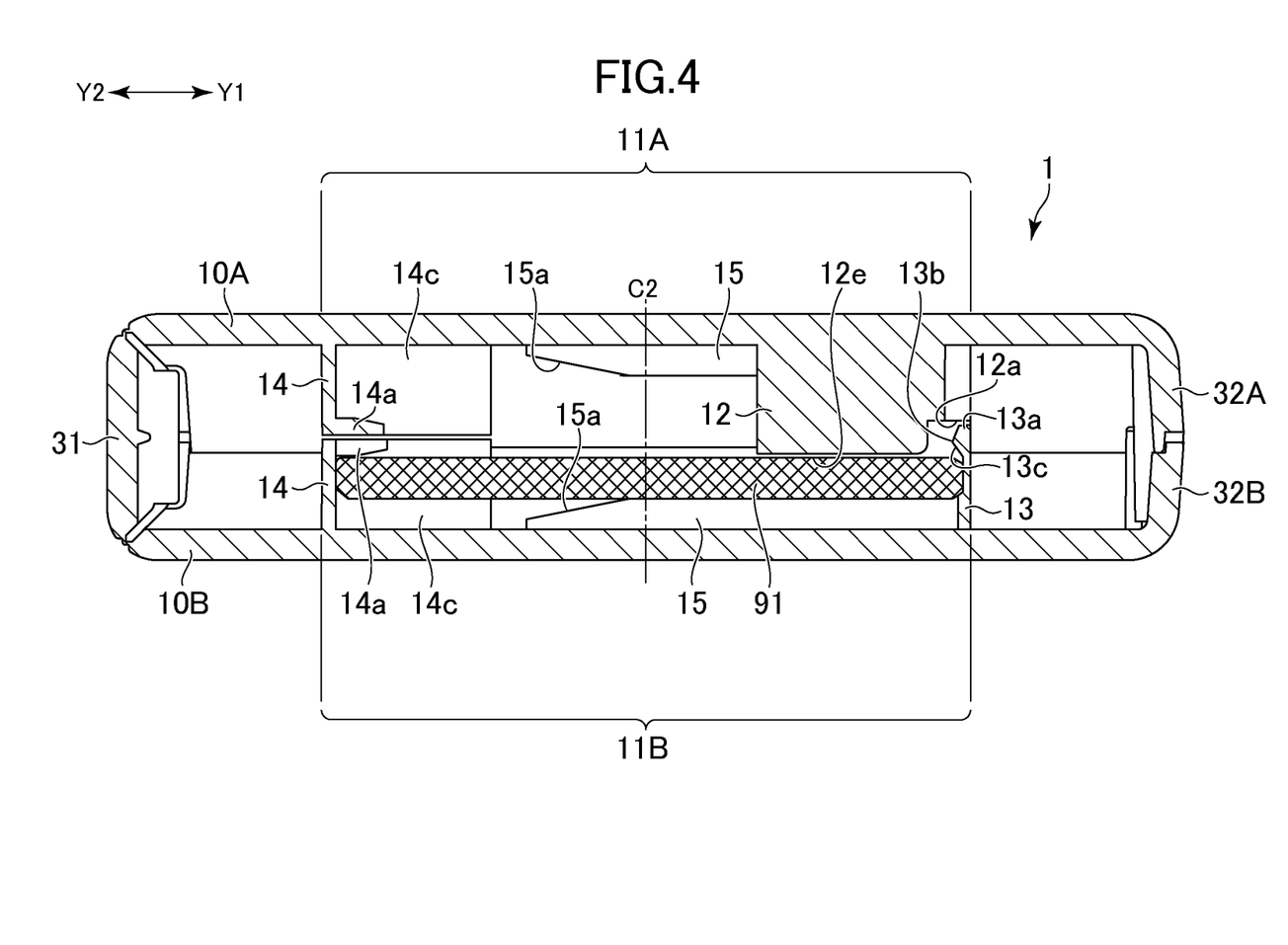
FIG. 4 is a cross sectional view of a storing case in the closed state along the line IV-IV shown in FIG. 3.
Figure 5:
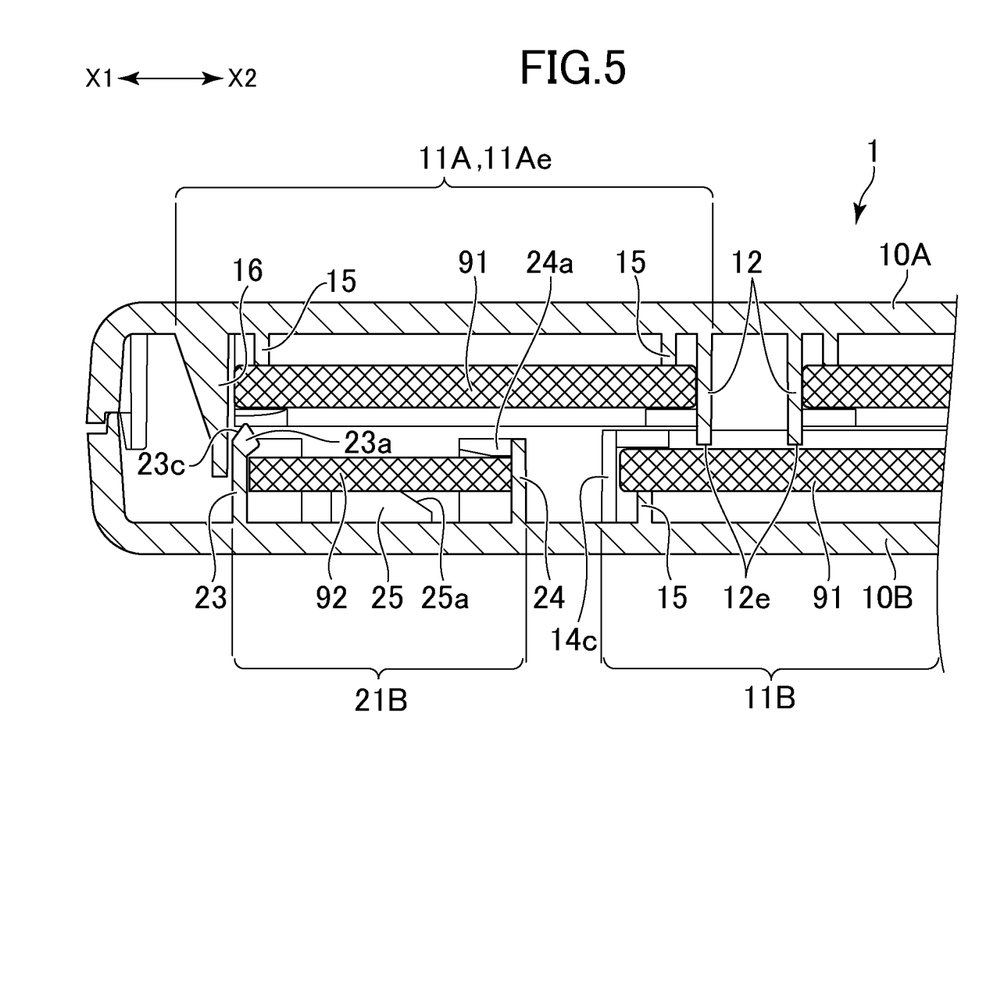
FIG. 5 is a cross sectional view of a storing case in the closed state along the line V-V shown in FIG. 3.
Figure 6:
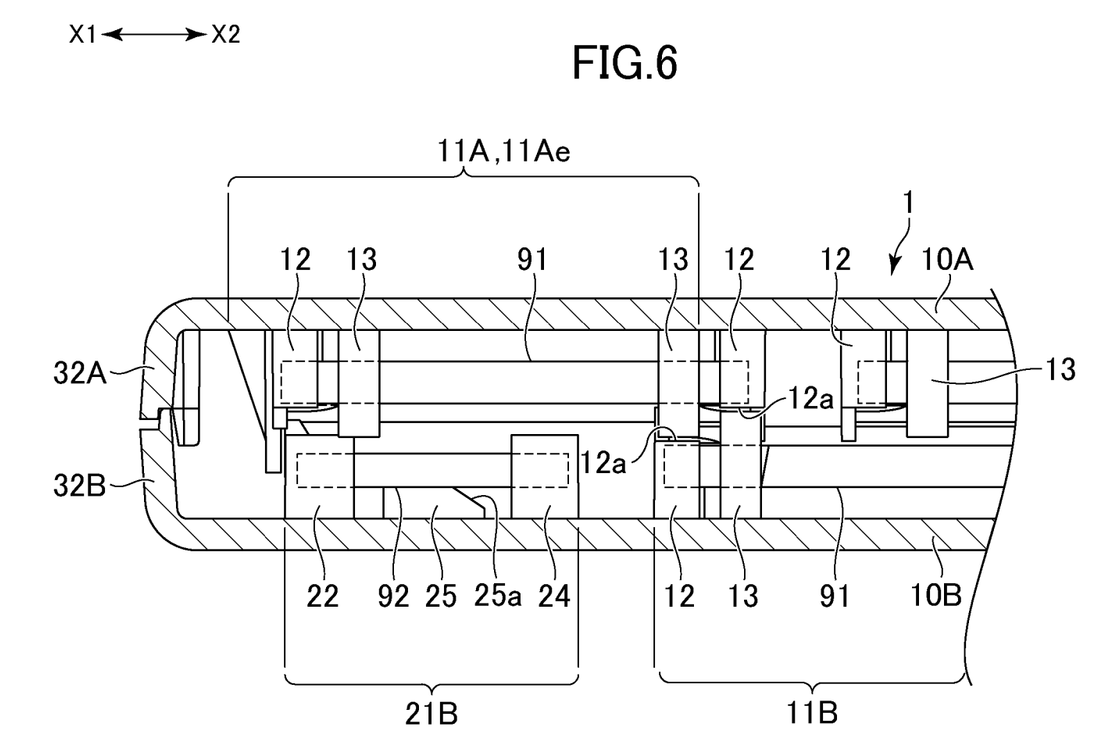
FIG. 6 is a cross sectional view of a storing case in the closed state along the line VI-VI shown in FIG. 3.

In the following, one embodiment of the present invention will be described with reference to the accompanying drawings. FIG. 1 is a perspective view of a storing case 1 according to one embodiment of the present invention. FIG. 2 is a perspective view showing the case 1 in an open state. FIG. 3 is a plan view showing the case 1 in an open state. FIGS. 4 to 6 are cross sectional views showing the case 1 in a closed state. Specifically, FIG. 4 shows a cross section along the line IV-IV shown in FIG. 3; FIG. 5 shows a cross section along the line V-V shown in FIG. 3; FIG. 6 shows a cross section along the line VI-VI shown in FIG. 3. In the description below, the directions indicated by X1 and X2 in FIG. 2 are defined as the leftward and rightward directions, respectively, and the directions indicated by Y1 and Y2 in FIG. 2 are defined as the forward and rearward directions, respectively.

As shown in FIG. 2, the storing case 1 includes a first case panel 10A and a second case panel 10B that can be opened and closed relative to the first case panel 10A. The first case panel 10A and the second case panel 10B are connected to each other through a connection wall 31 provided therebetween. The case panels 10A, 10B can be opened and closed using the connection wall 31 as the middle. The case 1 in the closed state is substantially rectangular (see FIG. 1), and the connection wall 31 functions as one of the side walls of the case 1. The entirety of the first case panel 10A and the second case panel 10B is surrounded by half walls 32A, 32B formed on the respective outer circumferential edges of the panels 10A, 10B. When the case 1 is closed, the half wall 32A formed on the first case panel 10A is combined with the hall wall 32B formed on the second case panel 10B, together functioning as a side wall of the case 1. A lock mechanism is formed on the respective half walls 32A, 32B so that the case 1 is held closed by the lock mechanism. Specifically, a claw 32a is formed at the middle of the half wall 32A in the left-right direction, and a groove 32b is formed in a corresponding position on the half wall 32B, into which the claw 32a is inserted. The claw 32a and the groove 32b together constitute the lock mechanism.

The first case panel 10A includes, on a surface thereof which faces the second case panel 10B in the closed state of the case 1, a plurality of holders for holding memory cards 91, 92. The first case panel 10A includes two kinds of holders in different size. That is, the first case panel 10A includes a plurality of first main holders 11A and a first sub-holder 21A that is smaller in size than the first main holder 11A. The first sub-holder 21A is used for holding a memory card 92. The first main holder 11A is used for holding a memory card 91. The holders 11A, 21A are positioned apart from the half wall 32A formed on the outer circumferential edge of the first case panel 10A.

Each memory card 91, 92 is a card-type memory device including a flash memory or a small hard disk, and used in an electronic device such as, e.g., a game device, a digital camera, a portable phone, a personal computer, and so forth. Each memory card 91, 92 may not be limited to a general purpose memory card, such as, e.g., an SD card, but may be a dedicated memory device that is exclusively used for a specific electronic device (e.g., a game device).

Similar to the first case panel 10A, the second case panel 10B includes, on a surface thereof that faces toward the first case panel 10A in the closed state of the case 1, a plurality of holders for holding the memory cards 91, 92. In this example, the second case panel 10B includes a plurality of second main holders 11B and a second sub-holder 21B that is smaller in size than the second main holder 11B. The holders 11B, 21B are positioned apart from the hall wall 32A formed on the outer circumferential edge of the second case panel 10B. In this regard, the number of first main holders 11A and the number of the second main holders 11B are equal.

The first main holder 11A has a shape surrounding an area where the memory card 91 is placed, and is used for holding the memory card 91. As shown in FIG. 2, the first main holder 11A has a stopper wall 12 and a holding wall 14 both standing on the first case panel 10A. These walls 12, 14 together surround an area where the memory card 91 is placed. The walls 12, 14 restrict movement of the memory card 91 in the front-back direction and the left-right direction, and can indicate an area to place the memory card 91 to a user.

As shown in FIG. 2, the first main holder 11A includes a plurality of (two in this example) hooks 13 formed on the opposite side to the holding wall 14. The hook 13 will be hooked on an edge of the memory card 91. The hook 13 is elastically deformable. In insertion and removal of the memory card 91 with respect to the first main holder 11A, the insertion and removal can be allowed by elastically deformation of the hook 13. The two hooks 13 are positioned apart from each other in the left-right direction and formed so as to be arranged along an edge of the memory card 91 arranged. The two hooks 13, together with the walls 12, 14, surround an area where the memory card 91 is placed. The size of the area surrounded by the hook 13 and the walls 12, 14 fit into the size of the memory card 91.

As shown in FIG. 2, the holding wall 14 includes, on respective top edges thereof, a plurality of (two in this example) overhang portions 14a for holding edges of the memory card 91 on the opposite side to the hooks 13. The two overhang portions 14a are positioned apart from each other in the left-right direction. In this example, the holding wall 14 includes side walls 14c formed on the respective both ends thereof (right and left ends) and surrounds the corners of the area for placing the memory card 91. The overhang portion 14a spreads toward inside the area for placing the memory card 91 from the top edge at the corner of the holding wall 14. The overhang portion 14a and the hook 13 hold the memory card 91 inside the first main holder 11A. In this regard, the stopper walls 12 are formed respectively on the right and left sides of the area for placing the memory card 91 and function as side walls. That is, the stopper wall 12 and the side wall 14c together restrict movement of the memory card 91 in the left-right direction. The stopper wall 12 will be described later in detail.

In this example, similar to the first main holder 11A, the second main holder 11B has a shape surrounding an area where the memory card 91 is placed to hold the memory card 91. That is, as shown in FIG. 2, the second main holder 11B includes the stopper wall 12 and the holding wall 14. That is, the width of the stopper wall 12 of the second main holder 11B in the front-back direction, the width of the holding wall 14 of the second main holder 11B in the left-right direction, the width of the side wall 14c in the front-back direction, and the size of the hook 13 are identical to those of the first main holder 11A.

In this example, as to both of the first main holder 11A and the second main holder 11B, the holding wall 14 is positioned closer to the center line C1, and the hook 13 is positioned farther from the center line C1 than the holding wall 14. In this example, the second main holder 11B has a line-symmetrical shape relative to the first main holder 11A. That is, the shape of the second main holder 11B and that of the first main holder 11A are symmetrical with respect to the center line C1 that defines the middle in the front-back direction of the case 1 in the open state (FIG. 3). Accordingly, when the case 1 is arranged in an open state, the positions of the respective parts (e.g., the hook 13 and the holding wall 14) of the main holders 11A, 11B are identical to each other in the front-back direction. In this regard, the first main holder 11A and the second main holder 11B are offset from each other in the left-right direction, as to be described later in detail.

As shown in FIG. 2, a plurality of (two in this example) ribs 15 are formed inside the main holder 11A, 11B. The rib 15 supports the memory card 91 placed in the main holder 11A, 11B (see FIGS. 4 and 5). The rib 15 ensures a space between the memory card 91 and the case panel 10A, 10B. This makes it easier for a user to pick up the memory card 91. Each rib 15 is formed extending along a direction in which the hook 13 and the holding wall 14 are opposed to each other, that is, the front-back direction, in this example. In inserting or removing the memory card 91 with respect to the main holder 11A, 11B, a user once arranges the memory card 91 diagonally, as indicated by the two dot dashed line in FIG. 2. The upper edge of the rib 15 includes a slope 15a formed in apart thereof closer to the holding wall 14 (FIG. 4). The slope 15a facilitates insertion and removal of the memory card 91 with respect to the main holder 11A, 11B. As shown in FIG. 4, a claw 13a is formed at the tip end of the hook 13. The claw 13a has a slope 13c formed on a surface thereof facing the memory card 91 placed in the main holder 11A, 11B. The slope 13c is formed diagonal to the horizontal direction, that is, a direction in parallel to the case panel 10A, 10B. The slope 13c facilitates removal of the memory card 91 from the main holder 11A, 11B.

The first main holder 11A and the second the holder 11B are arranged such that, in the closed state of the case 1, the areas surrounded by the respective holders 11A, 11B, that is, areas where the memory cards 91 are respectively placed, face each other at least partially. The first main holder 11A includes a projection that projects toward the second case panel 10B in the closed state of the case 1 and prevents separation of the memory card 91 from the second main holder 11B. This structure can prevent separation of the main card 91 from the second main holder 11B. Because separation of the memory card 91 is prevented by utilizing a part of the first main holder 11A, an area on the first case panel 10A can be effectively utilized. Below, an area surrounded by the first main holder 11A and that by the second main holder 11B are each hereinafter referred to as a card placement area.

In this example, the stopper wall 12 functions as the above-described projection (see FIGS. 4 and 5). In the closed state of the case 1, the areas surrounded by the second main holders 11B overlap the stopper wall 12, respectively. The height of the stopper wall 12 is designed such that the memory card 91 contacts on the top edge 12e (FIG. 4) of the stopper wall 12 before the memory card 91 placed in the second main holder 11B comes off the hook 13, that is, before moves over the claw 13a formed on the tip end of the hook 13.

As shown in FIG. 4, the top edge 12e of the stopper wall 12 of the first main holder 11A is positioned toward the second case panel 10B beyond the tip end of the hook 13 of the second main holder 11B. In detail, the top edge 12e of the stopper wall 12 of the first main holder 11A is positioned toward to the second case panel 10B beyond the top (peak) 13b of the claw 13a of the hook 13. This structure can more reliably prevent separation of the memory card 91 from the second main holder 11B.

Further, as shown in FIG. 4, the top edge 12e of the stopper wall 12 of the first main holder 11A is positioned toward to the second case panel 10B beyond the surface (the surface toward the first case panel 10A) of the overhang portion 14a of the holding wall 14 formed on the second main holder 11B. This structure can further reliably prevent separation of the memory card 91 from the second main holder 11B. In this regard, the top edge 12e of the stopper wall 12 is positioned toward to the second case panel 10B beyond the top edge of the holding wall 14 of the second main holder 11B.

As shown in FIG. 4, the height of the stopper wall 12 of the first main holder 11A is designed such that a slight clearance is defined between the memory card 91 placed in the second main holder 11B and the top edge 12e of the stopper wall 12. This structure can prevent the memory card 91 from receiving a force. That is, for example, when the case 1 is closed and the lock mechanism applies a force for keeping the two case panels 10A, 10B closer to each other, the clearance can prevent the force by the lock mechanism from being applied to the memory card 91 through the stopper wall 12.

As shown in FIG. 2, similar to the first main holder 11A, the second main holder 11B as well has a projection that projects toward the first case panel 10A for preventing separation of the memory card 91 placed in the first main holder 11A from the first main holder 11A. In this example, as described above, the second main holder 11B has the stopper wall 12, and the stopper wall 12 functions as the projection. The shape and size of the stopper wall 12 of the second main holder 11B are identical to those of the stopper wall 12 of the first main holder 11A. Further, the relative position of the stopper wall 12 of the second main holder 11B relative to the first main holder 11A is identical to that of the stopper wall 12 of the first main holder 11A relative to the second main holder 11B. In the closed state of the case 1, the areas surrounded by the first main holders 11A overlap the stopper walls 12 formed in the second main holders 11B, respectively. The relative position of the stopper wall 12 relative to the holder 11A, 11B will be described later in detail.

As shown in FIG. 3, the first main holders 11A in this example are aligned in the left-right direction at the same interval. Similarly, the second main holders 11B as well are aligned in the left-right direction at the same interval. When the case 1 is closed, the first main holders 11A are offset in the left-right direction from the second main holders 11B. That is, the plurality of first main holders 11A and the plurality of second main holders 11B are alternately positioned in the left-right direction and positioned on the both sides of the center line C1. In this example, all of the first main holders 11A are offset in the left-right direction from all of the second main holders 11B, with the offset width (amount) being smaller than the width of each main holder 11A, 11B in the left-right direction. According to this layout, the stopper wall 12 of the first main holder 11A projects toward inside the card placement area defined by the second main holder 11B. Similarly, the stopper wall 12 of the second main holder 11B as well projects toward inside the card placement area defined by the first main holder 11A. As a result, the top edge 12e of the stopper wall 12 can face the memory card 91. In this regard, the first case panel 10A and the second case panel 10B are connected to each other through the edges thereof that extend along the direction (the left-right direction) in which the main holders 11A, 11B are offset. The offset width (amount) between the first main holder 11a and the second main holder 11B should not be equal to the width of the main holder 11A, 11B in the left-right direction, but may be larger than the width of the main holder 11A, 11B in the left-right direction.

As shown in FIG. 4, in the closed state of the case 1, the position of the first main holder 11A in this example is not offset from the position of the second main holder 11B in the front-back direction. The height of the holding wall 14 of the first main holder 11A is designed lower to an extent to avoid interfere between the first main holder 11a and the second main holder 11B. Meanwhile, the stopper wall 12 projects more largely than the holding wall 14. In this regard, because the position of the first main holder 11A is not offset from the position of the second main holder 11B in the front-back direction, the width of the case 1 in the front-back direction can be reduced.

The first main holder 11A includes two stopper walls 12 opposed to each other in the left-right direction (see FIG. 2). As shown in FIG. 3, in the closed state of the case 1, the card placement area of the second main holder 11B overlaps both of the card placement areas of two adjacent first main holders 11A (in FIG. 3, the second main holder 11B and the second sub-holder 21B are hatched for clarification, and the positions of the first main holder 11A and the first sub-holder 21A in the closed state are indicated by the two-dot dashed line). In other words, a part of the card placement area of one second main holder 11B faces one of the areas of two adjacent first main holders 11A, and the rest faces the area of the other first main holder 11A. The stopper walls 12 of two adjacent first main holders 11A project toward the area of one second main holder 11B. With this structure, separation of one memory card 91 is prevented by two stopper walls 2. As a result, separation of the memory card 91 can be more reliably prevented. This is true with the memory card 91 held in the first main holder 11A. That is, in the closed state of the case 1, the card placement area of the first main holder 11A faces both of the areas of two adjacent second main holders 11B. Therefore, the stopper walls 12 of two second main holders 11B project toward the card placement area of one first main holder 11A.

As shown in FIG. 2, the plurality of first main holders 11A aligned in the left-right direction include a main holder 11Ae positioned at one end of the alignment. Similarly, the plurality of second main holders 11B aligned in the left-right direction include a main holder 11Be positioned at one end of the alignment. In a state where the case 1 is closed, the main holder 11Ae, 11Be faces the second sub-holder 21B, 21A, which is smaller in size than the main holder 11A, 11B. Therefore, the card placement area defined by the main holder 11Ae, 11Be at the end has only one stopper wall 12 projecting thereto. For example, only the stopper wall 12 of the second main holder 11B adjacent to the second sub-holder 21B projects toward the main holder 11Ae.

The card placement area defined by the main holder 11A, 11B is substantially rectangular, being in conformity with the shape of the memory card 91. That is, one side of the card placement area is longer than another side perpendicular to that side. The stopper wall 12 functions as a side wall extending in the longitudinal direction, that is, along the longer side of the card placement area. This arrangement of the stopper wall 12 ensures a sufficient length thereof. Consequently, even when an force is applied to the case 1, the force can be avoided from being concentrated onto one part of the memory card 91 through the stopper wall 12. In this example, the longitudinal width (the width in the front-back (Y1-Y2) direction) of each card placement area is longer than the lateral width (the width in the left-right direction (X1-X2) direction). In this regard, the stopper wall 12 functions as a wall extending in the front-back direction of the card placement area.

As described above, the rib 15 for supporting the memory card 91 is formed in the card placement area. In a cross section of the case 1 in the left-right direction as shown in FIG. 4, the rib 15 formed on the second main holder 11B partially overlaps the stopper wall 12 of the first main holder 11A in the closed state of the case 1. That is, as to the positions in the front-back direction, the rib 15 formed on the second main holder 11B is partially identical to the stopper wall 12 of the first main holder 11A. Similarly, as to the positions in the front-back direction, the rib 15 formed on the first main holder 11A is partially identical to the stopper wall 12 of the second main holder 11B. Such a layout of the rib 15 and the stopper wall 12 makes it likely that the force applied to the memory card 91 through the stopper wall 12 is withstood by the rib 15. That is, a shearing force applied to the memory card 91 can be reduced As described above, the second main holder 11B includes the hook 13 and the wall 14. The hook 13 is elastically deformable. As shown in FIG. 4, the stopper wall 12 of the first main holder 11A projects to a position closer to the hook 13 than the holding wall 14 of the second main holder 11B. This layout of the stopper wall 12 can more reliably prevent the memory card 91 from coming off the hook 13 of the second main holder 11B. In this example, the stopper wall 12 is positioned toward the hook 13 from the center C2 of the card placement area of the second main holder 11B in the front-back direction. Similarly, the stopper wall 12 of the second main holder 11B is positioned toward the hook 13 from the holding wall 14 of the first main holder 11A.

As described above, the plurality of first main holders 11A are aligned in the left-right direction, and the second main holders 11B as well are aligned in the left-right direction. The longitudinal direction of the card placement area of the first/second main holder 11A, 11B is perpendicular to the direction in which the first/second main holders 11A, 11B are aligned. In this example, as shown in FIG. 3, the longitudinal direction of the card placement area is along the front-back direction. This layout can reduce the length in the left-right direction of the case 1. Further, in this example, the sub-holder 21A, 21B is aligned in the left-right direction with the main holders 11A, 11b. The sub-holder 21A, 21B is substantially rectangular, with the longitudinal direction thereof, that is, the direction along the longer side thereof, being along the front-back direction. However, the layout of the main holders 11A, 11B and the sub-holder 21A, 21B is not limited to the above described layout. For example, the main holder 11A, 11B and the sub-holder 21A, 21B may be placed such that the longitudinal directions thereof are along the left-right direction. Such a layout can reduce the width of the case 1 in the front-back direction.

As described above, in the closed state of the case 1, the position of the first main holder 11A and that of the second main holder 11B are not offset from each other in the front-back direction. Accordingly, a part of the first main holder 11A is placed overlapping apart of the second main holder 11B. In this example, as shown in FIGS. 3 and 6, one of the two hooks 13 of the first main holder 11A overlaps the stopper wall 12 of the second main holder 11B, and one of the two hooks 13 of the second main holder 11B overlaps the stopper wall 12 of the first main holder 11A. In order to avoid interference between the hook and the wall, a cut-off 12a is defined on the stopper wall 12 (see FIG. 2).

As described above, the first case panel 10A includes a plurality of first main holders 11A and a first sub-holder 21A that is smaller in size than the first main holder 11A. Similarly, the second case panel 10B includes a plurality of second main holder 11B and a second sub-holder 21B that is smaller in size than the second main holder 11B. These two sub-holders 21A, 21B have the same size and function as a holder for holding the memory card 92 which is smaller in size than the memory card 91.

As shown in FIG. 2, the plurality of holders 11A, 21A formed on the first case panel 10A are aligned in the left-right direction. That is, the first main holders 11A are aligned successive, and the first sub-holder 21A is positioned at one end of the alignment of the plurality of holders 11A, 21A. Specifically, the first sub-holder 21A is positioned at one end (the right end in this example) of the alignment in the direction opposite from the direction in which the first main holders 11A are offset from the second main holders 11B (leftward in this example). According to this arrangement of the first sub-holder 21A, the memory card 92 can be stored while effectively utilizing a space resulted due to the positional offset between the first main holders 11A and the second main holder 11B. Similarly, the second sub-holder 21B is positioned at one end of the alignment of the plurality of holders 11B, 21B formed on the second case panel 10B. Specifically, the second sub-holder 21B is positioned at one end (the left end in this example) of the alignment in the direction opposite from the direction in which the second main holders 11B are offset from the first main holders 11A (rightward in this example). In this regard, positioning the smaller sub-holder 21A, 21B at an end of the alignment of the holders enables each first main holder 11A to be offset from the second main holder 11B in the left-right direction. Consequently, the stopper wall 12 of the main holder 11A, 11B can project toward the card placement area.

As shown in FIG. 2, the first sub-holder 21A has a shape surrounding an area where the memory card 92 is placed and being used for holding the memory card 92. Specifically, the first sub-holder 21A includes a holding wall 24 and two walls 22 positioned apart from each other. The holding wall 24 and the walls 22 together surround an area where the memory card 92 is placed. In this example, each wall 22 has an L-shape that surrounds a corner of the area. In addition, the both ends of the holding wall 24 are bent toward the respective walls 22 to surround the respective corners of the area. Further, the holding wall 24 is formed capable of holding one edge of the memory card 92. Specifically, the holding wall 24 includes an overhang portion 24a formed at a corner of a top edge thereof, so that an edge of the memory card 92 can be inserted into between the overhang portion 24a and the first case panel 10A. The first sub-holder 21A includes, on the opposite side from the holding wall 24, a hook 23 for being hooked on an edge of the memory card 92. The hook 23 and the holding wall 24 enable the first sub-holder 21A to hold the memory card 92. In this regard, the second sub-holder 21B formed on the second case panel 10B includes the holding wall 24, the walls 22, and the hook 23, similar to the first sub-holder 21.

As shown in FIG. 2, a plurality of (two in this example) ribs 25 are formed inside the sub-holder 21A, 21B. The rib 25 supports the memory card 92 placed in the sub-holder 21A, 21B (see FIG. 5). The rib 25 ensures a space between the memory card 92 and the case panel 10A, 10B, which resultantly makes it easier for a user to pick up the memory card 92. The rib 25 is formed extending in the direction (the left-right direction in this example) in which the hook 23 and the holding wall 24 face each other. The rib 25 includes a slope 25a on the upper edge thereof in apart closer to the holding wall 24 (FIG. 5). The slope 25a can facilitate insertion and removal of the memory card 92 with respect to the sub-holder 21A, 21B.

In a state where the case 1 is closed, the second sub-holder 21B is positioned opposed to the first main holder 11Ae positioned at an end of the alignment of the holders 11A, 21A (see FIG. 3). As shown in FIG. 2, the first main holder 11Ae additionally includes a hook stopper wall 16, besides the walls 12, 14 described above. The hook stopper wall 16, together with the other walls 12, 14, surrounds the area where the memory card 91 is placed. The hook stopper wall 16 restricts elastic deformation of the hook 23 of the second sub-holder 21B in the closed state of the case 1. Specifically, as shown in FIG. 5, the hook stopper wall 16 is positioned in a direction from the hook 23, in which the hook 23 is elastically deformed, and is arranged along the hook 23. In this example, the hook 23 of the second sub-holder 21B is elastically deformed leftward (X1) in inserting or removing the memory card 92 with respect to the second sub-holder 21B. The hook stopper wall 16 is positioned to the left of the hook 23 in the closed state of the case 1, and restricts elastic deformation of the hook 23. With this structure, the memory card 92 can be prevented from separating from the second sub holder 21B, without having the hook stopper wall 16 abutting on the memory card 92.

Similar to the relationship between the second sub-holder 21B and the first the holder 11Ae, the first sub-holder 21A is positioned opposed to the second main holder 11Be at an end of the alignment of the plurality of holders 11B, 21B. As shown in FIG. 2, the second main holder 11Be as well includes the hook stopper wall 16 for restricting movement of the hook 23 of the first sub-holder 21A.

In this regard, the hook stopper wall 16 in this example extends beyond the tip end of the hook 23. Specifically, as shown in FIG. 5, the tip end of the hook stopper wall 16 of the first main holder 11Ae is positioned toward to the second case panel 10B beyond the claw 23a of the hook 23 of the second sub-holder 21B.

As shown in FIG. 5, the tip end of the hook 23 has a slope 23c formed on a side toward the hook stopper wall 16. The slope portion 23c is diagonal relative to the direction in which the hook stopper wall 16 moves when closing the case 1. The slope 23c enables the hook stopper wall 16 to smoothly move to a position along the hook 23, that is, the position shown in FIG. 5, even if the hook stopper wall 16 hits on the tip end of the hook 23 while moving.

As described above, the second sub-holder 21B is smaller in size than the first holder 11A. Accordingly, as shown in FIG. 3, not only the second sub-holder 21B, but also a part of the second main holder 11B adjacent to the second sub-holder 21B are placed overlapping the card placement area of the first main holder 11Ae in the closed state. Consequently, the stopper wall 12 of the second main holder 11B projects toward the memory card 91 placed in the first main holder 11Ae. This structure makes it possible to prevent separation of the memory card 91 from the first main holder 11Ae, without a projection or the like in the second sub-holder 21B for preventing separation of the memory card 91.

The second sub-holder 21B is positioned leftmost among the plurality of holders 21B, 11B formed on the second case panel 10B, and the hook 23 is positioned in a left part of the second sub-holder 21B. According to this layout of the hook 23, the elastic deformation of the hook 23 can be restricted by utilizing a part of the left wall of the first main holder 11Ae, that is, the hook stopper wall 16. Similarly, the first sub-holder 21A is positioned rightmost among the plurality of holders 21A, 11A formed on the first case panel 10A, and the hook 23 is positioned in a right part of the thus positioned second sub-holder 21A. According to this layout of the hook 23, the elastic deformation of the hook 23 can be restricted by utilizing a part of the right wall of the second main holder 11Be, that is, the hook stopper wall 16.

As described above, in the main holders 11A, 11B, the hook 13 and the holding wall 14 are opposed to each other in the front-back direction. Meanwhile, in the sub-holders 21A, 21B, the hook 23 and the holding wall 24 are opposed to each other in the left-right direction, which is perpendicular to the direction in which the hook 13 and the holding wall 14 are opposed.

As described above, the areas surrounded by the main holders 11A (11Ae) of the first case panel 10A respectively face the areas surrounded by the respective holders 11B, 21B of the second case panel 10B, at least partially. Further, the main holders 11A and the main holder 11Ae have the stopper walls 12 and the hook stopper wall 16, respectively, that project toward the second case panel 10B to prevent separation of the memory cards 91, 92 placed in the holders 11B, 21B. This structure can prevent separation of the memory card 91, 92.

Further, the plurality of first main holders 11A are aligned in the left-right direction and the plurality of second main holders 11B as well are aligned in the left-right direction. The first main holder 11A is positioned offset in the left-right direction from the second main holder 11B. This layout enables the side walls of the holders 11A, 11B, that is, the stopper walls 12 to prevent separation of the memory card 91 in a structure where the first main holder 11A has an identical size to that of the second main holder 11B.

Further, the plurality of main holders 11B and the main holder 11Be have the stopper walls 12 and the hook stopper wall 16, respectively, that project toward the first case panel 10A to prevent separation of the memory cards 91, 92 placed in the holders 11A, 21A. This structure can prevent separation of the memory card 91, 92 arranged on the first case panel 10A.

Further, the stopper wall 12 of the first main holder 11A projects toward inside the card placement area surrounded by the second main holder 11B. This can prevent separation of the memory card 91, using a simple structure.

The first main holder 11A has the walls 12, 14 that surround an area where the memory card 91 is placed. A part of the walls 12, 14, namely the stopper wall 12, is formed extending in the longitudinal direction of the area where the memory card 91 is placed. This makes it possible to readily ensure a sufficient length of the stopper wall 12.

The stopper wall 12 of each first main holder 11A projects toward a position closer to the hook 13 than the holding wall 14 of the second main holder 11B. This can more reliably prevent separation of the memory card 91.

The main holder 11Ae formed on the first case panel 10A has the hook stopper wall 16 projecting toward the second case panel 10B to restrict elastic deformation of the hook 23 of the second sub-holder 21B. This can prevent separation of the memory card 92 while reducing a force applied to the memory card 92.

The first sub-holder 21A is positioned at an end of the alignment of the main holders 11 in the opposite direction from the direction in which the plurality of first main holders 11A are offset from the second main holders 11B. This enables effective use of the area on the first case panel 10A.

Note that the present invention is not limited to the above described case 1, and various modifications are possible.

For example, although the sub-holders 21A, 21B are formed in the above described example, the sub-holders 21A, 21B may not be necessary provided. Alternatively, the sub-holder 21A, 21B may be provided only on either one of the case panels 10A, 10B, but not on the other case panel.

Although the same number of main holders 11A and main holders 11B are formed on the first case panel 10A and the second case panel 10B, respectively, in the above-described example, the number may differ between the two case panels 10A, 10B.

The first main holder 11A and the second main holder 11B are offset from each other in the left-right direction, and the first case panel 10A and the second case panel 10B are connected to each other through the edges thereof extending in the left-right direction. However, the first main holder 11A and the second main holder 11B may be offset in the left-right direction, and the first case panel 10A and the second case panel 10B may be connected to each other through edges thereof extending in the direction perpendicular to the direction in which the holders 11A, 11B are offset (e.g., the front-back direction).

Although the stopper wall 12 functioning as a side wall prevents separation of the memory card 91 in the above describe example, any other part of the first main holder 11A and the second main holder 11B may prevent separation of the memory card 91 instead.

What is claimed is:

1. A storing case, comprising:
   a first case panel;
   a second case panel capable of being opened and closed relative to the first case panel;
   a plurality of first holders formed on a surface of the first case panel facing toward the second case panel, each first holder being for holding a memory card and surrounding an area where the memory card is placed;
   a plurality of second holders formed on a surface of the second case panel facing toward the first case panel, each second holder for holding a memory card and surrounding an area where the memory card is placed, wherein the area surrounded by at least one of the first holders faces the area surrounded by at least one of the second holders, at least partially;
   at least one hook included in at least one of the plurality of second holders, the hook including a body extending from the surface of the second case panel and a claw proximate to a distal end of the body such that the claw operates to releasably engage and retain the memory card; and
   a projection included in at least one of the first holders, the projection extending from the surface of the first case panel toward the second case panel and having a length sufficient to engage a surface of the memory card facing the first case panel and to prevent the claw from releasing the memory card held in the at least one of the second holders when the first and second case panels are closed to prevent the memory card from separating from the at least one of the second holders.

2. The storing case according to claim 1, wherein
   the plurality of first holders are aligned in a first direction,
   the plurality of second holders are aligned in the first direction,
   the plurality of first holders are offset from the plurality of second holders in the first direction, and
   each of the plurality of the first holders respectively includes the projection projecting toward the second case panel.

3. The storing case according to claim 2, wherein:
   each of the first plurality of holders includes at least one hook having a body extending from the surface of the first case panel and a claw proximate to a distal end of the body such that the claw operates to releasably engage and retain the memory card; and
   each of the plurality of second holders includes a projection, the projection extending from the surface of the second case panel toward the first case panel and having a length sufficient to engage a surface of the memory card facing the second case panel and prevent the claw from releasing the memory card when the first and second case panels are closed to prevent the memory card arranged in each of the plurality of first holders from separating therefrom.

4. The storing case according to claim 2, wherein the projection of each first holder projects toward inside the area surrounded by each of the plurality of second holders.

5. The storing case according to claim 4, wherein
   each of the plurality of first holders includes a wall that surrounds the area where the memory card is placed,
   a part of the wall functions as the projection and extends along a longitudinal direction of the area where the memory card is placed.

6. The storing case according to claim 4, wherein
   each of the plurality of second holders includes an elastically deformable hook for being hooked on an edge of the memory card, and a holding portion for holding an opposite edge of the memory card, and
   the projection of each of the plurality of first holders projects toward a position inside the area surrounded by each second holder, the position being closer to the hook than the holding portion.

7. The storing case according to claim 1, wherein:
   at least one of the plurality of second holders includes an elastically deformable hook for being hooked on an edge of the memory card, and
   at least one further projection of the at least one of the first holders projects toward the second case panel to restrict elastic deformation of the hook of the at least one of the second holders.

8. The storing case according to claim 2, wherein
   the plurality of first holders include a plurality of first main holders and a first sub-holder that is smaller in size than the first main holder,
   the plurality of first main holders are offset from the plurality of second holders in the first direction, and
   the first sub-holder is positioned at an end of alignment of the plurality of first holders in a opposite direction to the first direction.

* * * * *